United States Patent
Fujita

(10) Patent No.: US 10,989,560 B2
(45) Date of Patent: Apr. 27, 2021

(54) MAP DATA CORRECTING METHOD AND DEVICE

(71) Applicant: Nissan Motor Co., Ltd., Yokohama (JP)

(72) Inventor: Susumu Fujita, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 16/619,248

(22) PCT Filed: Jun. 7, 2017

(86) PCT No.: PCT/JP2017/021189
§ 371 (c)(1),
(2) Date: Dec. 4, 2019

(87) PCT Pub. No.: WO2018/225198
PCT Pub. Date: Dec. 13, 2018

(65) Prior Publication Data
US 2020/0166364 A1 May 28, 2020

(51) Int. Cl.
*G01C 21/36* (2006.01)
*H04W 4/40* (2018.01)
*G06F 16/29* (2019.01)
*G01C 21/32* (2006.01)
(Continued)

(52) U.S. Cl.
CPC .......... *G01C 21/367* (2013.01); *G01C 21/32* (2013.01); *G01C 21/3614* (2013.01); *G06F 8/65* (2013.01); *G06F 16/29* (2019.01); *G09B 29/102* (2013.01); *H04W 4/40* (2018.02)

(58) Field of Classification Search
None
See application file for complete search history.

(56) References Cited

U.S. PATENT DOCUMENTS 5,825,328 A * 10/1998 Schipper ............... G01S 19/42
342/357.29
5,926,117 A * 7/1999 Gunji ................... G05D 1/0274
340/988
(Continued)

FOREIGN PATENT DOCUMENTS

| JP | 2000230834 A | 8/2000 |
|---|---|---|
| JP | 2001280975 A | 10/2001 |

(Continued)

OTHER PUBLICATIONS

Gackstatter et al., Fusion of Clothoid Segments for a More Accurate and Updated Prediction of the Road Geometry, Intelligent Transportation Systems (ITSC), Sep. 19, 2010; International IEEE Conference, 6 pages.

*Primary Examiner* — Bhavesh V Amin
(74) *Attorney, Agent, or Firm* — Young Basile Hanlon & MacFarlane, P.C.

(57) ABSTRACT

A map data correcting method for correcting map data used in a vehicle using a controller includes executing a first correction process of uniformly offsetting the map data as a whole to reduce a first error that is a general position error of the map data and executing a second correction process of reducing a second error that is a position error still remaining in the map data even after uniformly offsetting the map data as a whole.

15 Claims, 11 Drawing Sheets

US 10,989,560 B2
Page 2

(51) Int. Cl.
*G06F 8/65* (2018.01)
*G09B 29/10* (2006.01)

(56) References Cited

U.S. PATENT DOCUMENTS

| | | | | |
|---|---|---|---|---|
| 7,024,307 B2* | 4/2006 | Ito | G01C 21/30 | 701/446 |
| 7,949,466 B2* | 5/2011 | Atarashi | G01C 21/32 | 701/446 |
| 8,996,197 B2* | 3/2015 | Joh | G01C 21/30 | 701/1 |
| 9,052,207 B2* | 6/2015 | Miksa | G01S 13/865 | |
| 9,352,747 B2* | 5/2016 | Nagatsuka | B60W 30/143 | |
| 9,529,092 B2* | 12/2016 | Friend | G01S 19/14 | |
| 9,857,181 B2* | 1/2018 | Song | G01C 21/30 | |
| 9,897,453 B2* | 2/2018 | Yamashiro | G01S 19/51 | |
| 9,952,049 B2* | 4/2018 | Zhang | G01C 21/16 | |
| 10,209,089 B2* | 2/2019 | Behrendt | G06K 9/629 | |
| 2005/0102098 A1* | 5/2005 | Montealegre | G01C 21/32 | 701/533 |
| 2006/0271249 A1* | 11/2006 | Testrake | G09B 9/08 | 701/3 |
| 2007/0271036 A1* | 11/2007 | Atarashi | G01C 21/32 | 701/446 |
| 2010/0191421 A1* | 7/2010 | Nilsson | B62D 6/003 | 701/41 |
| 2010/0194593 A1* | 8/2010 | Mays | B60W 10/20 | 340/905 |
| 2010/0198491 A1* | 8/2010 | Mays | B60W 30/09 | 701/124 |
| 2011/0098886 A1* | 4/2011 | Deng | G08G 1/166 | 701/41 |
| 2011/0118979 A1* | 5/2011 | Mao | G01C 21/005 | 701/532 |
| 2011/0244881 A1* | 10/2011 | Bando | G01S 5/021 | 455/456.1 |
| 2012/0053831 A1* | 3/2012 | Halder | G01S 19/49 | 701/439 |
| 2015/0298696 A1* | 10/2015 | Nagatsuka | B60W 30/16 | 701/70 |
| 2016/0358477 A1* | 12/2016 | Ansari | G06Q 30/0251 | |
| 2020/0166364 A1* | 5/2020 | Fujita | G01C 21/3614 | |

FOREIGN PATENT DOCUMENTS

| | | |
|---|---|---|
| JP | 2001351114 A | 12/2001 |
| JP | 2002341754 A | 11/2002 |
| JP | 2007101690 A | 4/2007 |
| JP | 2009129084 A | 6/2009 |
| JP | 2010259021 A | 11/2010 |

* cited by examiner

MAP DATA CORRECTING METHOD AND DEVICE

TECHNICAL FIELD

The present invention relates to a map data correcting method and a map data correcting device.

BACKGROUND

A wireless device equipped in a vehicle is known, which operates to measure the current position of a subject vehicle, specify the travel direction and travel lane for the subject vehicle to travel toward an intersection, from map information associated with the measured current position of the subject vehicle, and perform vehicle-to-vehicle communication for the specified information (see JP2010-259021A, for example).

SUMMARY

The map data including lane information contains errors with respect to the actual position and direction of a lane. In the technique described in JP2010-259021A, therefore, the subject vehicle cannot be accurately positioned with respect to the lane on the map data on the basis of the measured positional information of the subject vehicle and the map data.

A problem to be solved by the present invention is to provide a map data correcting method and a map data correcting device with which the position of the subject vehicle can be accurately positioned with respect to the lane on the map data.

The present invention solves the above problem through executing a first correction process of uniformly offsetting the map data as a whole thereby to reduce a first error that is a general position error of the map data and executing a second correction process of reducing a second error that is a position error still remaining in the map data even after uniformly offsetting the map data as a whole.

According to the present invention, the degree of deviation between the actual lane and the lane in the map data can be reduced. The position of the subject vehicle can therefore be accurately positioned with respect to the lane on the map data.

DETAILED DESCRIPTION

Figure 1:
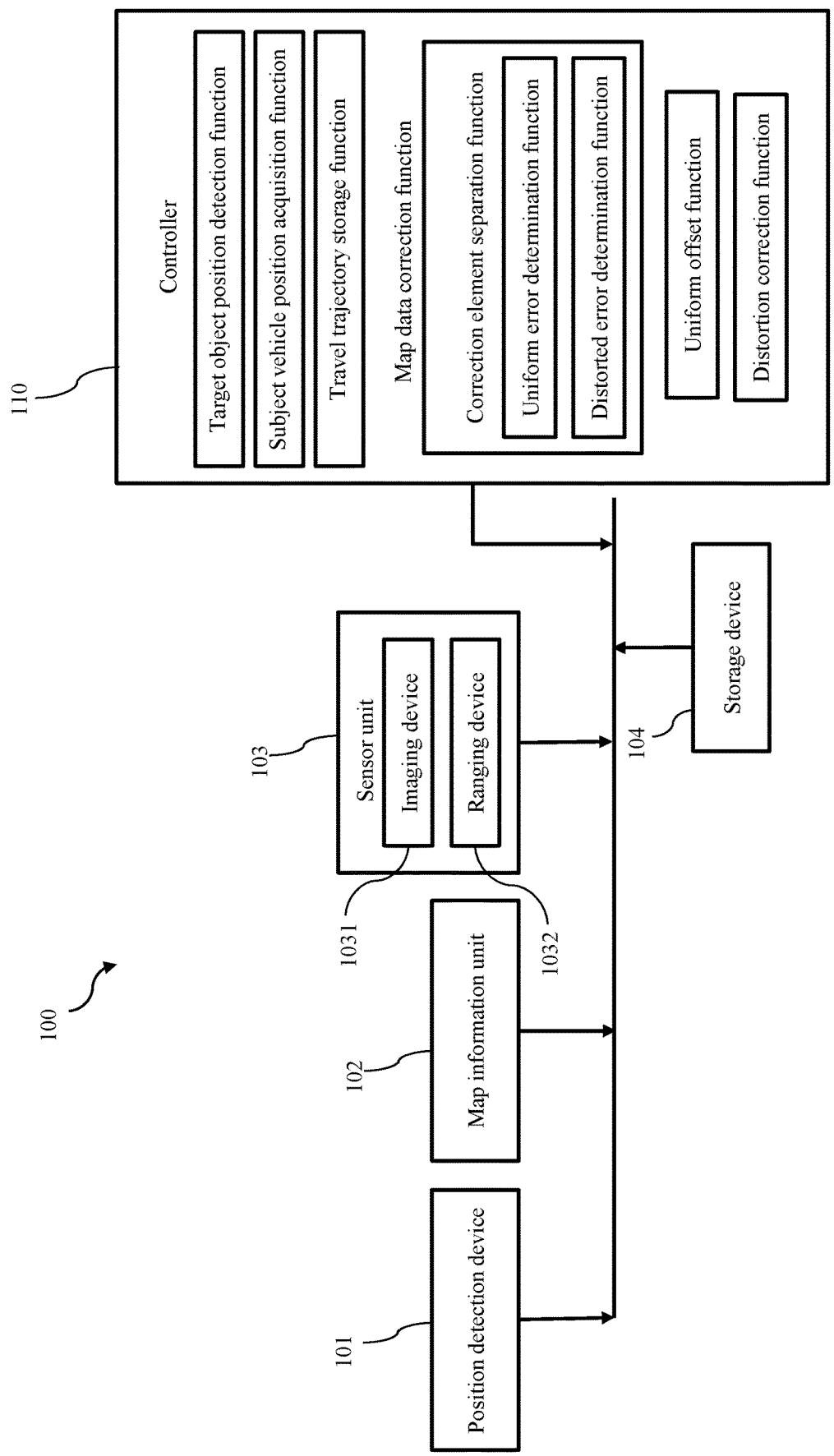
FIG. 1 is a block diagram illustrating the outline of a map data correcting device according to one or more embodiments of the present invention.

Hereinafter, one or more embodiments of the present invention will be described with reference to the drawings. FIG. 1 is a block diagram illustrating the outline of a map data correcting device 100 according to one or more embodiments of the present invention. The map data correcting device 100 illustrated in the figure operates to correct map data so as to reduce position errors contained in a high-definition map (HD map, referred simply to as "map data," hereinafter) used in driving assistance or autonomous (automated) driving. In one or more embodiments of the present invention, the position errors of the map data include errors between lane boundary lines stored in a storage device 104, which will be described later, and the lane boundary lines included in the map data, errors between travel trajectories of vehicles stored in the storage device 104 and lane centers included in the map data, and errors between features (target objects) stored in the storage device 104 and the features (target objects) included in the map data.

Figure 2:
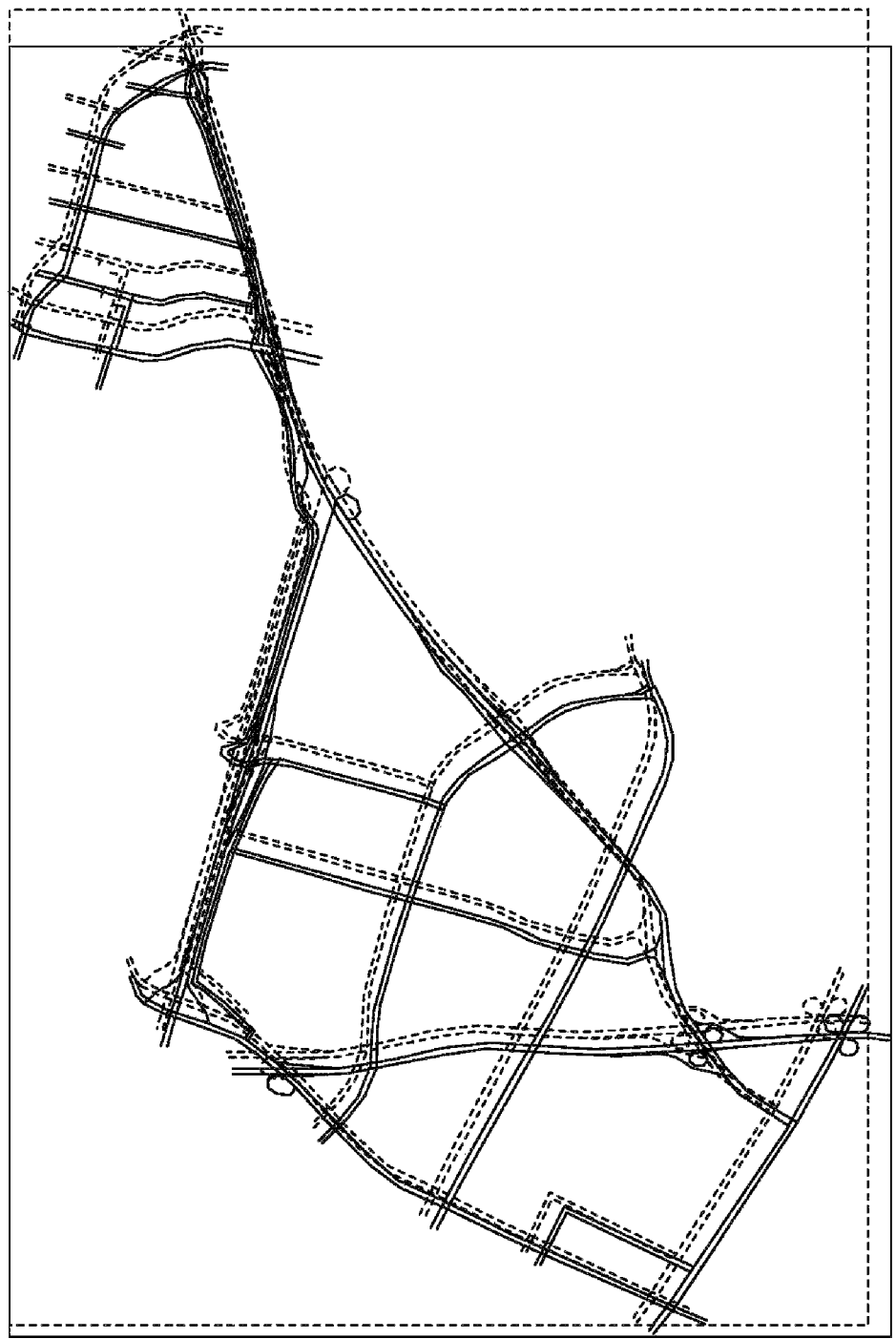
FIG. 2 is a diagram for describing errors between actual lanes and lanes included in map data.

FIG. 2 is a diagram for describing errors between actual lanes and lanes included in the map data. As illustrated in the figure, in general, errors occur between the actual positions and directions of lanes (indicated by solid lines) and the positions and directions of the lanes (indicated by broken lines) included in the map data. The map data correcting device 100 according to one or more embodiments of the present invention therefore operates to correct the positions and directions of lanes on the map data thereby to reduce the degrees of deviation between the actual positions and directions of the lanes and the positions and directions of the lanes included in the map data.

As illustrated in FIG. 1, the map data correcting device 100 includes a position detection device 101, a map information unit 102, a sensor unit 103, a storage device 104, and a controller 110. In a system according to one or more embodiments of the present invention, the position detection device 101, map information unit 102, sensor unit 103, storage device 104, and controller 110 are equipped in a vehicle, and these are connected to one another via an onboard LAN 106 such as a controller area network (CAN). In an alternative embodiment, the map information unit 102, storage device 104, and controller 110 may not have to be equipped in a vehicle, and these may be provided in a data center or other similar facilities connected to the onboard equipment via a communication network.

The controller 110 includes a read only memory (ROM) that preliminarily stores programs for achieving specific functions, which will be described later, and a central processing unit (CPU) that executes the programs preliminarily stored in the ROM.

The position detection device 101, which includes a global positioning system (GPS) receiver equipped in the vehicle, receives radio waves from GPS satellites to detect the current position (latitude/longitude) of the subject vehicle and outputs the detection result to the controller 110.

The position detection device 101 may include at least one of a gyro sensor, a vehicle speed sensor, and a camera as substitute for or in addition to the GPS receiver. That is, the position detection device 101 may detect the current position of the subject vehicle on the basis of at least one of the detection result of an angular velocity of the subject vehicle obtained by the gyro sensor, the detection result of a vehicle speed of the subject vehicle obtained by the vehicle speed sensor, and the lane information extracted from an image captured by the camera, as substitute for or in addition to the detection of the current position of the subject vehicle using the GPS. When the position detection device 101 includes at least one of a gyro sensor, a vehicle speed sensor, and a camera in addition to the GPS receiver, the position detection device 101 may perform self-position estimation by odometry measurement or other appropriate technique.

The map information unit 102 includes a database that preliminarily stores map data. The map data is a so-called electronic map and represents information in which the latitude and longitude are associated with the map information. The map data corresponds to the above-described high-definition map which includes the lane boundary information associated with each point and the positional information of target objects. Examples of the lane boundary information include those in which curves and straight lines of lane boundaries are represented by discrete point sequences and those in which curves and straight lines of lane boundaries are represented by mathematical formulae such as Basic-Spline (B-Spline) curves and Non-Uniform Rational Basis-Spline (NURBS) curves. The B-Spline curve is a smooth curve defined by a plurality of control points, and the NURBS curve is a smooth curve defined by a plurality of control points and a knot vector.

The sensor unit 103 includes an imaging device 1031 such as a wide-angle camera and a ranging device 1032 such as a laser range finder (LRF), or other similar devices. The imaging device 1031 and the ranging device 1032 are each provided at a bonnet, a bumper, a number plate, a headlight, a side mirror, or the periphery thereof. The imaging device 1031 captures images around the subject vehicle. The ranging device 1032 emits electromagnetic waves to the surroundings of the subject vehicle and detects the reflected waves. The imaging information obtained by the imaging device 1031 and the ranging information obtained by the ranging device 1032 are output to the controller 110. The controller 110 has a target object position detection function and detects relative positions of target objects (including features, which will be described later) existing around the subject vehicle to the subject vehicle on the basis of the imaging information output from the imaging device 1031 and the ranging information output from the ranging device 1032. Examples of the target objects include lines (such as lane marks) on a traveling road surface on which the subject vehicle travels, curbstones and guardrails on a road shoulder, traffic signals, and traffic signs. Here, the target object position detection function of the controller 110 serves to detect the relative positions of all the targets objects, which are detected by the imaging device 1031 and the ranging device 1032, to the subject vehicle. When a determination can be made that the targets objects detected by the imaging device 1031 are the same as the target objects detected by the ranging device 1032, the target object position detection function of the controller 110 may serve to detect only the target objects detected by any one of the imaging device 1031 and the ranging device 1032.

The storage device 104 includes one or more random access memories (RAMs) that serve as an accessible storage device. The controller 110 has a subject vehicle position acquisition function and acquires information on the current position of the subject vehicle from the position detection device 101. The controller 110 further has a travel trajectory storage function and arranges the positions of the subject vehicle output from the position detection device 101 in time series every predetermined time and stores them in the storage device 104 as a travel trajectory of the subject vehicle. For example, the subject vehicle is made to travel twice or more in the same lane to obtain a plurality of travel trajectories, from which an average is calculated and stored as the travel trajectory of the subject vehicle in the storage device 104.

Here, the travel trajectory storage function of the controller 110 according to one or more embodiments of the present invention serves to store, in the storage device 104, the travel trajectory of the subject vehicle and information on the relative positions of the target objects (in particular, lane boundary lines), which are detected using the target object position detection function, to the subject vehicle so that the travel trajectory and the information on the relative positions are associated with each other. In one or more embodiments of the present invention, the lane boundary lines stored in the storage device 104 in association with the travel trajectory of the subject vehicle correspond to true lane boundary lines, which will be described later.

Figure 3:
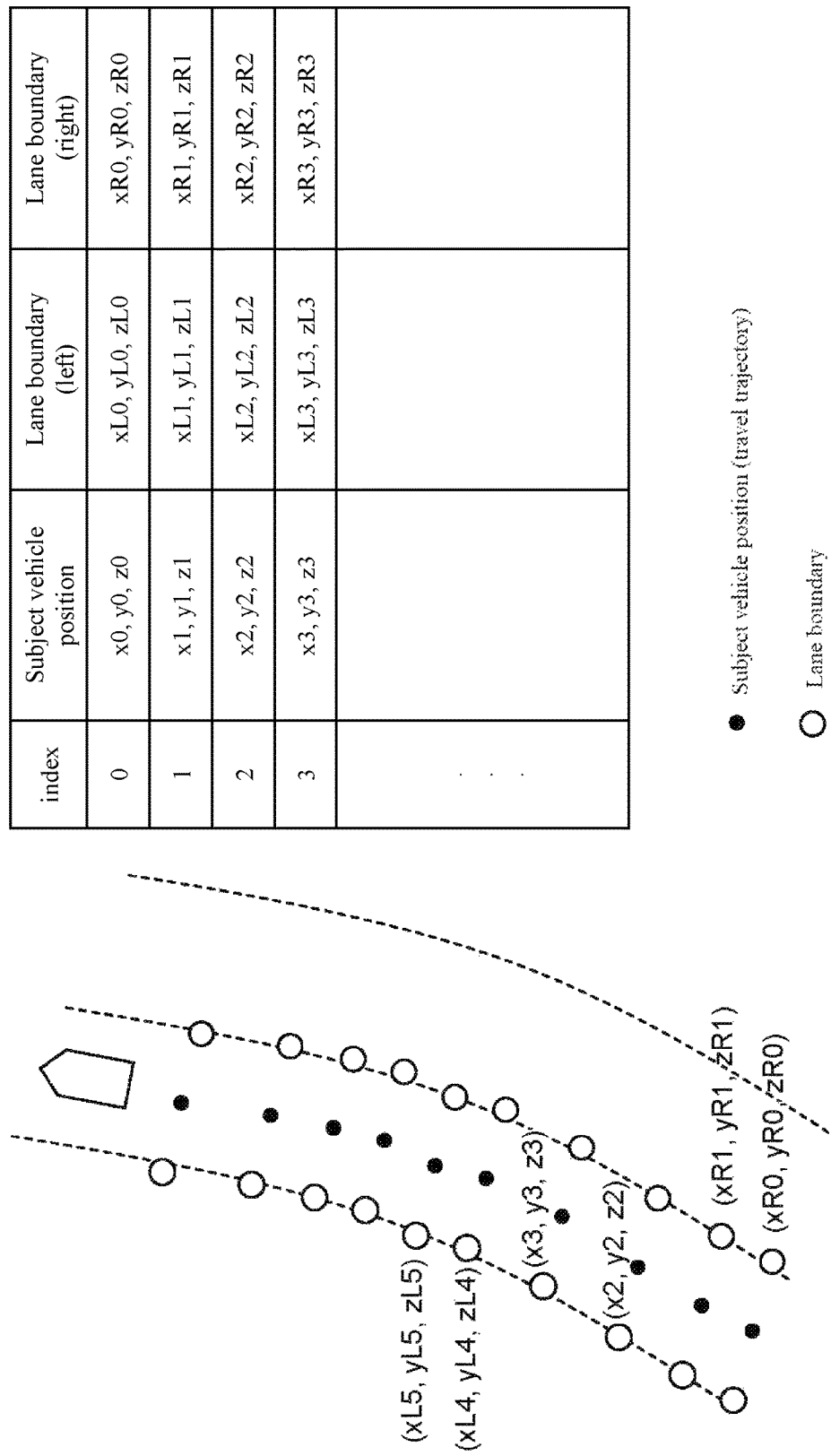
FIG. 3 is a diagram illustrating an example of a travel trajectory of the subject vehicle and lane boundary lines stored in a storage device illustrated in FIG. 1.

FIG. 3 is a diagram illustrating an example of the travel trajectory of the subject vehicle and lane boundary lines stored in the storage device 104. As illustrated in the figure, the storage device 104 is made to store a point sequence in which the positions of the subject vehicle (indicated by black circles) are arranged in time series, a point sequence in which points on the left-side lane boundary of a lane (indicated by white circles) are arranged in time series, and a point sequence in which points on the right-side lane boundary of the lane (indicated by white circles) are arranged in time series. As listed in the table of FIG. 3, the travel trajectory of the subject vehicle is obtained by arranging three-dimensional coordinates (GPS coordinates) of the subject vehicle in time series, and each lane boundary line is obtained by arranging the coordinates of the lane boundary (coordinates obtained by converting relative coordinates to the subject vehicle into GPS coordinates) in time series.

As illustrated in FIG. 1, the controller 110 has a map data correction function. The map data correction function serves to correct the map data so as to reduce errors between the positions and directions of lanes included in the map data, which is preliminarily stored in the map information unit 102, and the positions and directions of the lanes stored in the storage device 104.

In one or more embodiments of the present invention, when the driving assistance or autonomous driving is not executed (this mode will be referred to as an "offline mode," hereinafter), the subject vehicle is made to travel twice or more in the same area to acquire the travel trajectories of the subject vehicle and the lane boundary lines associated with the travel trajectories, and these are stored in the storage device 104. Then, the travel trajectories of the subject vehicle and the lane boundary lines associated with the travel trajectories, which are acquired during the offline mode and stored in the storage device 104, are used as true values. Instead of the travel trajectories of the subject vehicle and the lane boundary lines associated with the travel trajectories, lane boundary lines included in a map image such as an aerial photo or a satellite image may be employed as the true values.

Here, when the actual positions and directions of lanes are compared with the positions and directions of the lanes included in the map data, there are errors in general between the actual positions and directions and the positions and directions in the map data. The errors include uniform errors in which the actual positions and the positions in the map data are uniformly offset from each other as a whole and errors in which differences between the actual positions and directions and the positions and directions in the map data increase gradually from a reference point (the errors in the latter case will be referred to as "distorted errors," hereinafter). Accordingly, the map data correction function of the controller 110 according to one or more embodiments of the present invention serves to: detect the uniform errors between the actual positions of lanes and the positions of the lanes included in the map data and the distorted errors between the actual positions and directions of lanes and the positions and directions of the lanes included in the map data; uniformly offset the map data thereby to reduce the uniform errors; and gradually correct the map data from the reference point thereby to reduce the distorted errors.

The map data correction function of the controller 110 includes a correction element separation function, a uniform offset function, and a distortion correction function. The correction element separation function includes a uniform error determination function and a distorted error determination function. The uniform error determination function serves to detect the above-described uniform errors. On the other hand, the distorted error determination function serves to detect the above-described distorted errors. The uniform error determination function serves first to perform alignment between the lane boundary lines stored in the storage device 104 and the map data preliminarily stored in the map information unit 102.

Figure 4:
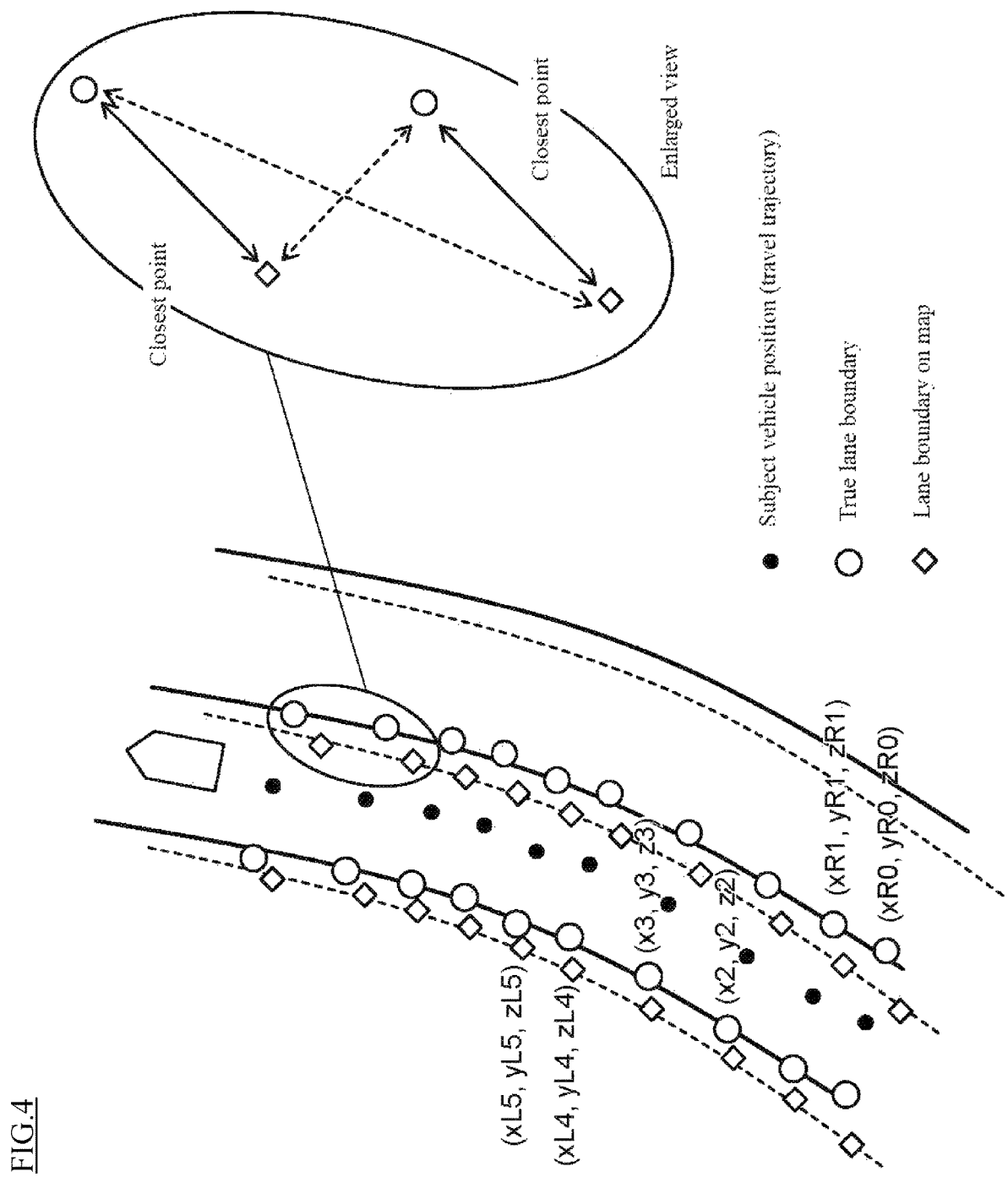
FIG. 4 is a diagram illustrating a state in which the lane boundary lines stored in the storage device illustrated in FIG. 1 and the map data preliminarily stored in a map information unit illustrated in FIG. 1 are aligned.

FIG. 4 is a diagram illustrating a state in which the lane boundary lines stored in the storage device 104 and the map data preliminarily stored in the map information unit 102 are aligned. As illustrated in the figure, the lane boundary lines stored in the storage device 104 and the lane boundary lines included in the map data are both information composed of respective pluralities of discrete points, and both can therefore be aligned to each other using the Iterative Closest Point (ICP) algorithm. In FIG. 4, black circles indicate the positions of the subject vehicle, white circles indicate points that constitute the true boundary lines (points on the true lane boundaries), and white diamond shapes indicate points that constitute the boundary lines on the map (points on the lane boundaries on the map).

The uniform error determination function serves first to detect a uniform error between a lane boundary line stored in the storage device 104 (referred to as a "true lane boundary line," hereinafter) and a lane boundary line included in the map data (referred to as a "lane boundary line on the map," hereinafter). In a step of detecting the uniform error, the uniform error determination function serves to search for points on the lane boundary line on the map that are located closest to respective points constituting the corresponding true lane boundary line (see the enlarged view of FIG. 4). Then, the uniform error determination function serves to calculate relative distances between the points constituting the true lane boundary line and the corresponding points on the lane boundary line on the map.

In the step of detecting the uniform error, the uniform error determination function then serves to calculate an error between the true lane boundary line and the lane boundary line on the map. Examples of a method for calculating the error between the true lane boundary line and the lane boundary line on the map include the following first method and second method.

Figure 5:
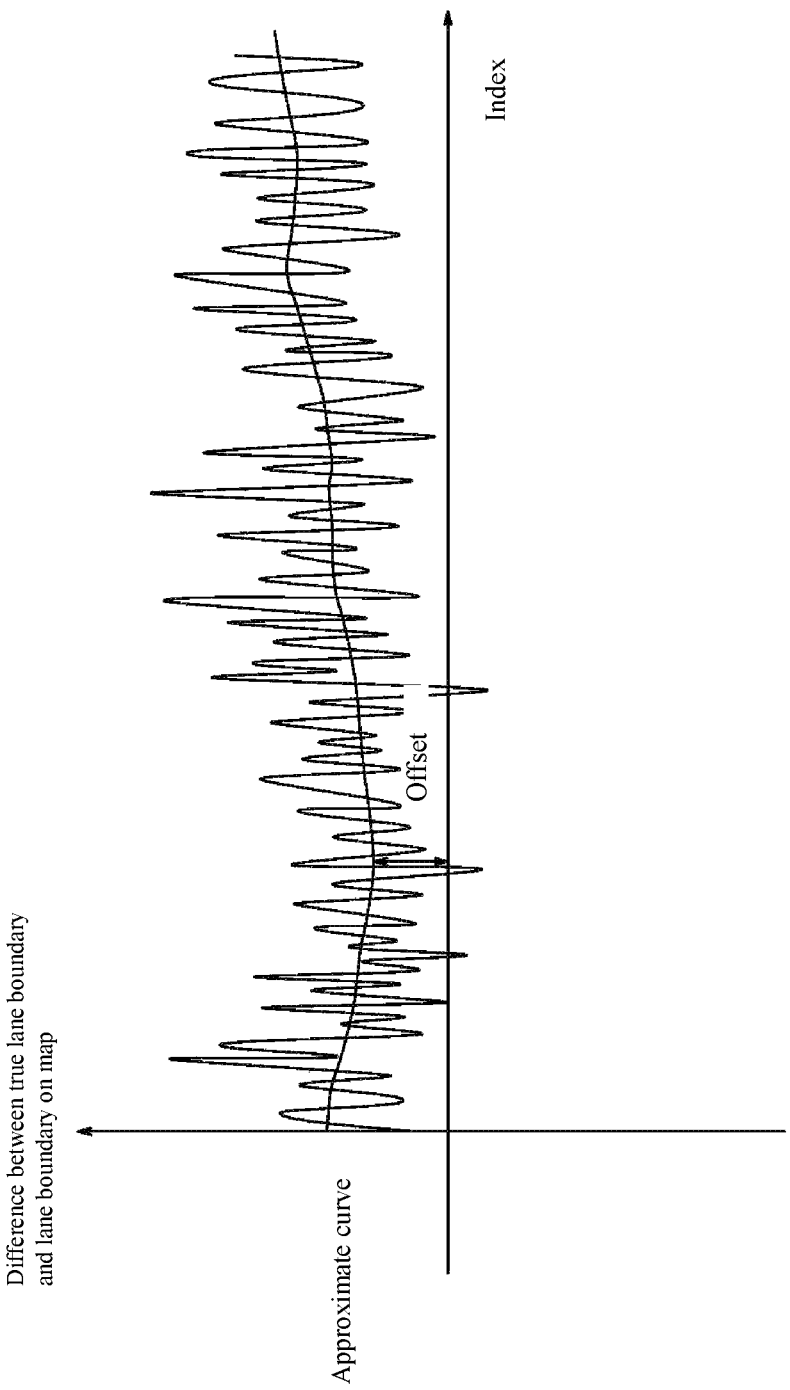
FIG. 5 is a diagram for describing a first method for calculating an error between a true lane boundary line and a lane boundary line on a map.
Figure 6:
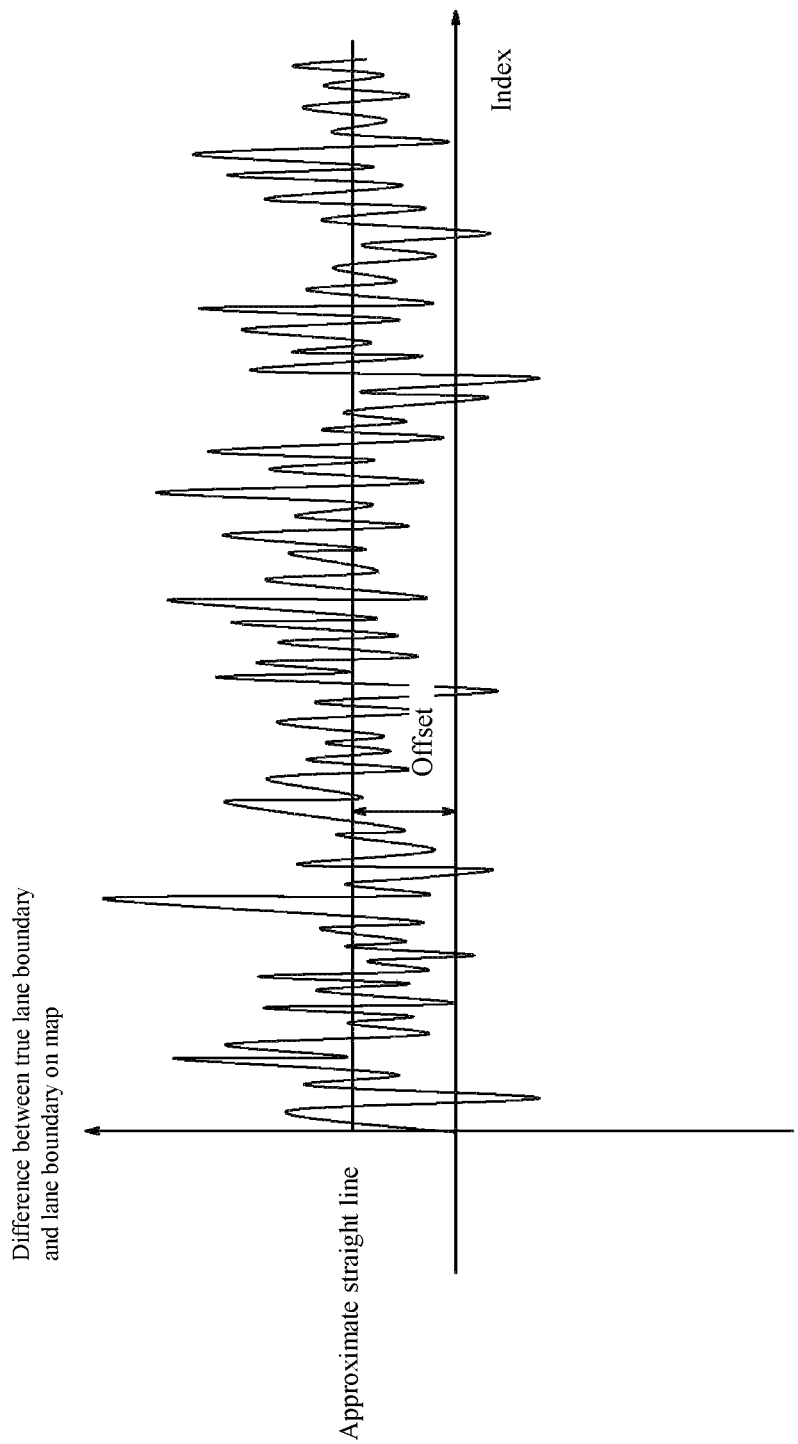
FIG. 6 is a diagram for describing the first method for calculating an error between the true lane boundary line and the lane boundary line on the map.

FIG. 5 and FIG. 6 are each a diagram for describing the first method for calculating the error between the true lane boundary line and the lane boundary line on the map. As illustrated in the figures, in the first method, the index of each point on the true lane boundary line and the index of each corresponding point on the lane boundary line on the map closest to the point on the true lane boundary line are represented by the horizontal axis, the relative distance between each point on the true lane boundary line and each corresponding point on the lane boundary line on the map closest to the point on the true lane boundary line is represented by the vertical axis, and such relative distances are plotted. Then, an approximate curve or an approximate straight line that fits the cloud of plotted points is obtained using the least-square method. Thereafter, an offset amount of the approximate curve or approximate straight line with respect to the horizontal axis (a straight line with a relative distance of zero) is obtained. As illustrated in FIG. 5, when the approximate curve is obtained, the minimum value of the offset amount of the approximate curve with respect to the horizontal axis is compared with a reference value. When the minimum value of the offset amount of the approximate curve with respect to the horizontal axis is larger than the reference value, a uniform error exists between the true lane boundary line and the lane boundary line on the map, and the magnitude of the uniform error is employed as the minimum value of the offset amount of the approximate curve with respect to the horizontal axis. On the other hand, as illustrated in FIG. 6, when the approximate straight line is obtained, the offset amount of the approximate straight line with respect to the horizontal axis is uniform. This uniform offset amount is compared with a reference value, and when this uniform offset amount is larger than the reference value, a uniform error exists between the true lane boundary line and the lane boundary line on the map, and the magnitude of the uniform error is employed as the offset amount of the approximate straight line with respect to the horizontal axis.

The second method for calculating the error between the true lane boundary line and the lane boundary line on the map is a method using the Fourier series expansion. In the second method, as in the first method, the index of each point on the true lane boundary line and the index of each corresponding point on the lane boundary line on the map closest to the point on the true lane boundary line are represented by the horizontal axis, the relative distance between each point on the true lane boundary line and each corresponding point on the lane boundary line on the map closest to the point on the true lane boundary line is represented by the vertical axis, and such relative distances are plotted. Then, when the Fourier series expansion can be applied to the cloud of plotted points, the Fourier series expansion is used to determine whether or not a uniform error exists between the true lane boundary line and the lane boundary line on the map.

When the cloud of plotted points is represented by $f(t)$, the following Equations (1) to (3) are obtained as a result of the Fourier series expansion.

[Equation 1]

$$f(t) = \frac{a_0}{2} + \sum_{n=1}^{\infty} (a_n \cos nt + b_n \sin nt) \quad (1)$$

[Equation 2]

$$a_n = \frac{1}{\pi} \int_{-\pi}^{\pi} f(t) \cos nt\, dt \quad (n = 0, 1, 2, 3, \ldots) \quad (2)$$

[Equation 3]

$$b_n = \frac{1}{\pi} \int_{-\pi}^{\pi} f(t) \sin nt\, dt \quad (n = 0, 1, 2, 3, \ldots) \quad (3)$$

The DC component ($=a_0/2$) included in the above Equation (1) as a result of the Fourier series expansion is compared with a reference value, and when the DC component is larger than the reference value, a uniform error exists between the true lane boundary line and the lane boundary line on the map, and the magnitude of the uniform error is represented by the DC component.

The above are methods for calculating a uniform error between the true lane boundary line and the lane boundary line on the map when the lane boundary line is stored in the storage device 104. On the other hand, when the lane boundary line is not stored in the storage device 104 and only the positions (travel trajectory) of the subject vehicle are stored in the storage device 104, the following method can be exemplified as a method for calculating a uniform error between the true lane boundary line and the lane boundary line on the map. Examples of the case in which the lane boundary line is not stored in the storage device 104 include a case in which no lane boundary lines exist on a road and a case in which the sensor unit 103 cannot detect a lane boundary line.

That method includes first confirming that the travel trajectory of the subject vehicle stored in the storage device 104 exists inside a lane on the map. In this confirmation process, a lane on the map to which any one of the plurality of points constituting the travel trajectory of the subject vehicle belongs is specified. Here, the map data usually has a structure in which road level information, lane level information, and other information are layered. That is, the road level information of the map data includes information on lane boundary lines and lane centerlines that constitute lanes and/or information on features (such as traffic signs, stop lines, and crosswalks) associated with lanes. Accordingly, if a lane in which any one of the plurality of points constituting the travel trajectory of the subject vehicle is located is specified, the lane boundary lines on the right and left sides of the lane can be specified. Then, an offset amount between the lane centerline which is equally spaced from the specified lane boundary lines on the right and left sides and the travel trajectory of the subject vehicle is calculated by the least-square method or the Fourier series expansion, and the calculated offset amount is compared with a reference value. When the offset amount is larger than the reference value, a uniform error exists between the true lane and the lane on the map, and the magnitude of the uniform error is employed as the minimum value of the offset amount between the lane centerline and the travel trajectory of the subject vehicle. In an alternative embodiment, after specifying a lane in which any one of the plurality of points constituting the travel trajectory of the subject vehicle is located, the centerline of the lane may be specified instead of specifying the lane boundary lines on the right and left sides of the lane. In such a case, an offset amount between the specified lane centerline and the travel trajectory of the subject vehicle is calculated by the least-square method or the Fourier series expansion, and the calculated offset amount is compared with a reference value. When the offset amount is larger than the reference value, a uniform error exists between the true lane and the lane on the map, and the magnitude of the uniform error is employed as the minimum value of the offset amount between the lane centerline and the travel trajectory of the subject vehicle.

Figure 7:
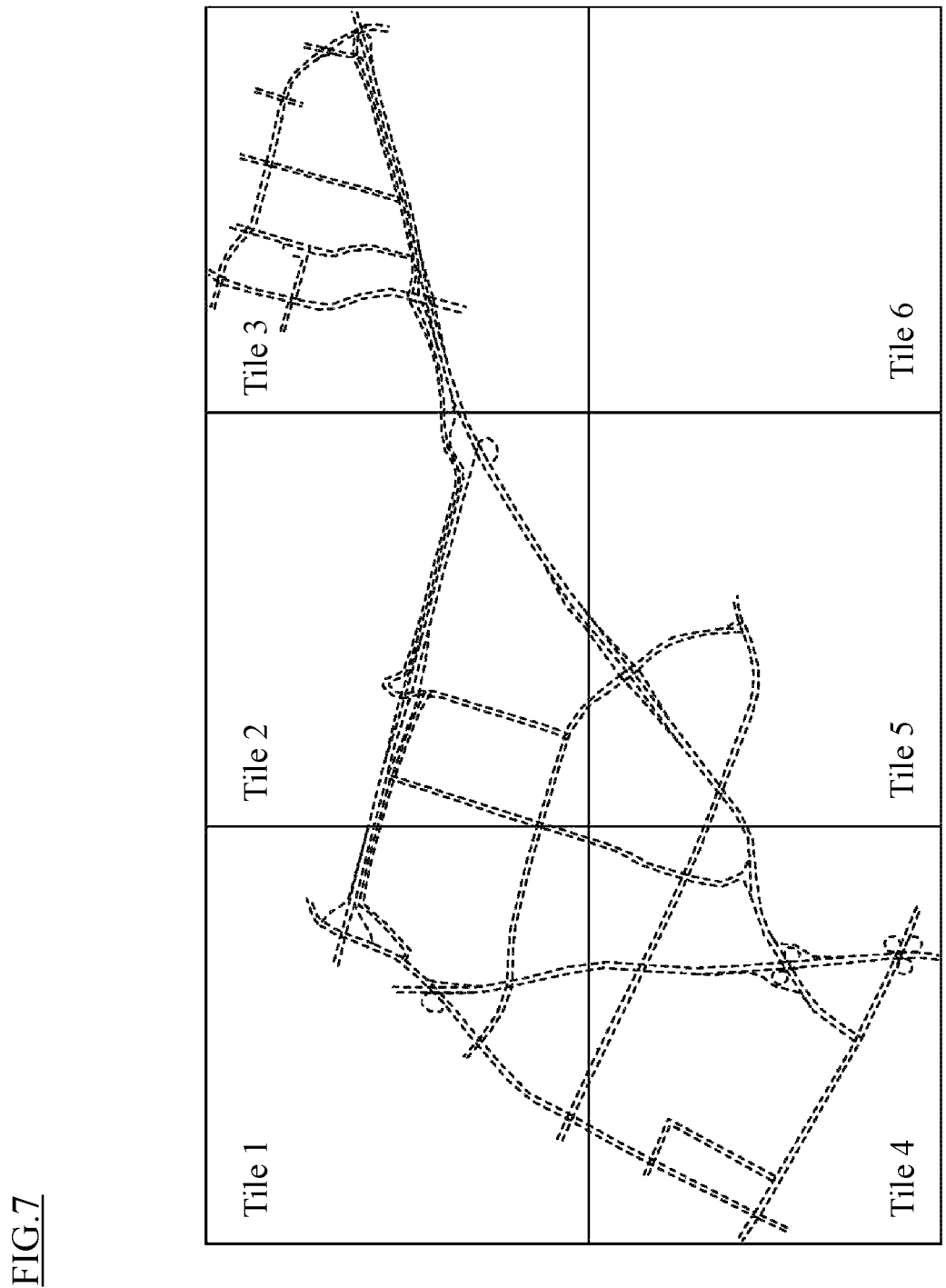
FIG. 7 is a diagram for describing map tiles.

FIG. 7 is a diagram for describing map tiles. As illustrated in the figure, the map data according to one or more embodiments of the present invention is divided into tiles. Here, the map data contains errors in absolute coordinates and errors in relative coordinates. In general, errors in absolute coordinates tend to be larger than errors in relative coordinates. As such, in the uniform offset of the map data, which will be described later, it is preferred to uniformly offset a limited range in the map data rather than uniformly offsetting the map data as a whole. From this viewpoint, the error between the map data and the actual environment can be reduced by limiting the range for uniformly offsetting the map data in terms of the tiles. To this end, in one or more embodiments of the present invention, the uniform error determination function serves first to calculate a uniform error between the true lane boundary line and the lane boundary line on the map in terms of the tiles. However, it is not essential to calculate the uniform error between the true lane boundary line and the lane boundary line on the map to uniformly offset the map data in terms of the tiles. For example, when the map data of the absolute coordinate system based on the latitude/longitude is converted into the map data of the orthogonal coordinate system for each area, a uniform error between the true lane boundary line and the lane boundary line on the map may be calculated to uniformly offset the map data for each area for which the conversion operation is performed.

After the uniform error between the true lane boundary line and the lane boundary line on the map is detected using the uniform error determination function, the uniform offset function serves to determine a uniform offset amount for uniformly offsetting the map data as a whole. When the uniform error is calculated by the above-described first method, the uniform offset function serves to determine the minimum value of the offset amount of the approximate curve with respect to the horizontal axis as the uniform offset amount. On the other hand, when the uniform error is calculated by the above-described second method, the uniform offset function serves to determine the DC component as the uniform offset amount. Here, the uniform offset function serves to determine the uniform offset amount for each of the positions in the x-axis direction, y-axis direction, and z-axis direction and the rotation angle around the z-axis.

Figure 8:
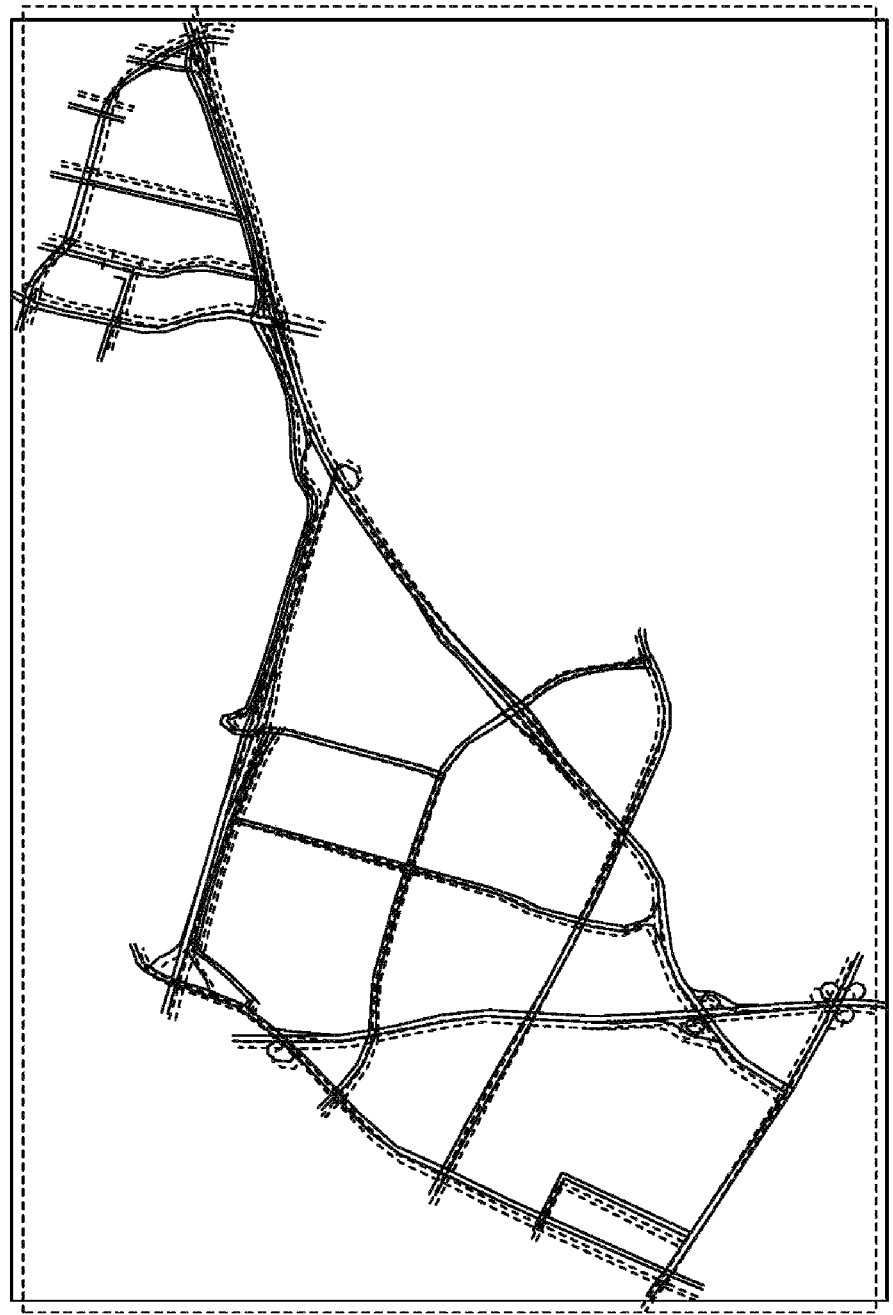
FIG. 8 is a diagram illustrating a state in which the map data is uniformly offset.

FIG. 8 is a diagram illustrating a state in which the map data is uniformly offset. As illustrated in the figure, the uniform offset function serves to offset the map data in the x-axis direction, y-axis direction, and z-axis direction and rotate the map data around the z-axis each by an amount corresponding to the determined uniform offset amount. Here, as illustrated in the figure, even after the map data is uniformly offset, errors remain between the true lanes and the lanes on the map. That is, the errors between the true lanes and the lanes on the map involve errors that cannot be removed merely by uniformly offsetting the map data. In this context, the map data correcting device 100 according to one or more embodiments of the present invention operates to uniformly offset the map data, thereafter calculate errors (the above-described distorted errors) remaining at this stage between the true lane boundary lines and the lane boundary lines on the map, and correct the map data so that the calculated distorted errors are reduced.

When the uniform error determination function serves to calculate the uniform error between a true lane boundary line and a lane boundary line on the map through the above-described first method, the distorted error determination function of the controller 110 serves to subtract the offset amount of the approximate curve or approximate straight line with respect to the horizontal axis from the relative distance between each point on the true lane boundary line and each corresponding point on the lane boundary line on the map closest to the point on the true lane boundary line. When the resulting value is larger than a reference value, the distorted error determination function serves to determine that the map data contains a distorted error. Here, when the approximate straight line fitting the cloud of plotted points for the relative distance can be obtained using the least-square method, a determination is made that no distorted error exists. On the other hand, when the approximate curve fitting the cloud of plotted points for the relative distance can be obtained using the least-square method, a determination is made that a distorted error exists. The magnitude of the distorted error refers to the relative distance between each point on the true lane boundary line and each corresponding point on the lane boundary line on the map closest to the point on the true lane boundary line. Here, distorted errors may be calculated for all the points which constitute a lane boundary line on the map. In this case, however, the processing load increases. In one or more embodiments of the present invention, therefore, the distorted errors are calculated by a method explained in the method for determining the correction amount of a distorted error, which will be described later. When the uniform error determination function serves to calculate the uniform error between a true lane boundary line and a lane boundary line on the map through the above-described second method, the distorted error determination function of the controller 110 can serve to calculate the AC component, which is obtained after performing the Fourier series expansion, as the distorted error.

The distortion correction function of the controller 110 serves to determine the correction amount of a distorted error for reducing the distorted errors of the map data. Here, the distortion correction function serves to determine the correction amount of a distorted error for each of the positions in the x-axis direction, y-axis direction, and z-axis direction and the rotation angle around the z-axis. For points at which the receiver sensitivity of the GPS receiver is less than a predetermined reference value due to the number of GPS satellites and GPS positioning mode or due to the situation of a travel path, such as a tunnel, an elevated path, or a tall building, the distortion correction function does not serve to carry out the correction of a distorted error. Moreover, for points at which a slip angle of the vehicle is not less than a predetermined reference value when the slip angle of the vehicle is detected using a vehicle state detection device (not illustrated), such as a gyro sensor, a vehicle speed sensor, or a wheel rotation angle sensor, and is stored in the storage device 104 together with the corresponding point, the distortion correction function does not serve to carry out the correction of a distorted error. Here, the distortion correction function preferably serves to determine the correction amount of a distorted error on the basis of information on distortion due to the shape of the earth.

Figure 9:
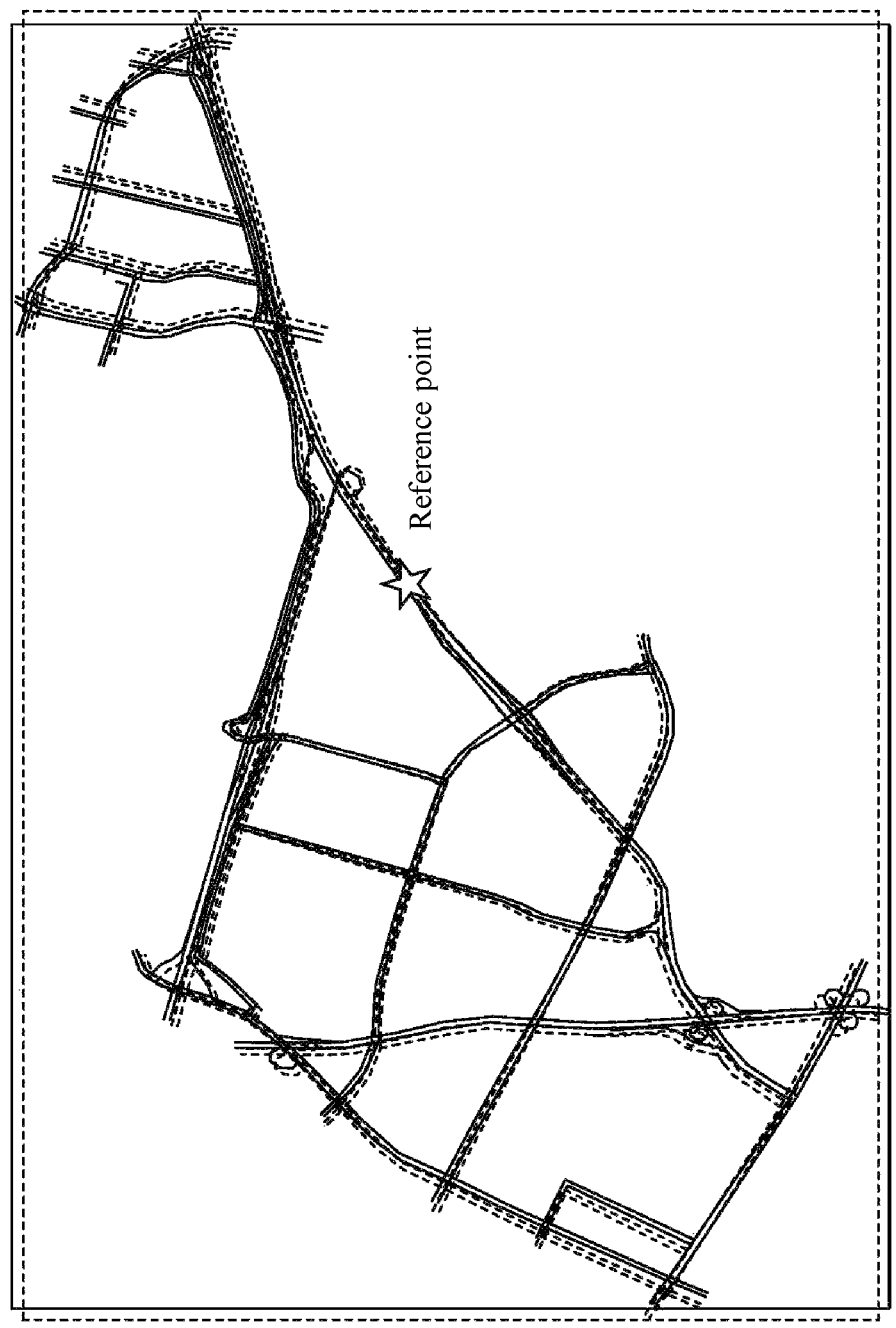
FIG. 9 is a diagram for describing a first method for determining the correction amount of a distorted error.

FIG. 9 is a diagram for describing a first method for determining the correction amount of a distorted error. When creating the map data with a certain point in the map as a reference point, it is envisaged that the distorted error included in the created map data increases gradually from the reference point toward the end point. The distortion of the map data can therefore be expressed by a mathematical function that increases linearly with respect to a certain point as the reference point. For example, first, the relative distance is calculated between each point on the true lane boundary line and each corresponding point on the lane boundary line on the map closest to the point on the true lane boundary line. Then, from sets of points on the true lane boundary line and respective corresponding points on the lane boundary line on the map closest to the points on the true lane boundary line, a set of points having the minimum relative distance is searched for. Then, in the sets of points on the true lane boundary line and respective corresponding points on the lane boundary line on the map closest to the points on the true lane boundary line, a point on the lane boundary line on the map to which the set of points having the minimum relative distance belongs is set as the reference point. Then, the correction amount of the distorted error at each point is determined as a value obtained by multiplying the distance from the reference point by a constant.

The second method for determining the correction amount of a distorted error is a method of determining the correction amount of a distorted error with reference to a specific point such as a point at which a feature exists. Features such as traffic signals and signs are the features to be references when creating the map data. Accordingly, the actual positions of features such as traffic signals and signs recognized by the sensor unit 103 equipped in the subject vehicle are compared with the positions of the features such as traffic signals and signs included in the map data, and the resulting errors can be determined as the correction amounts of the distorted errors.

Figure 10:
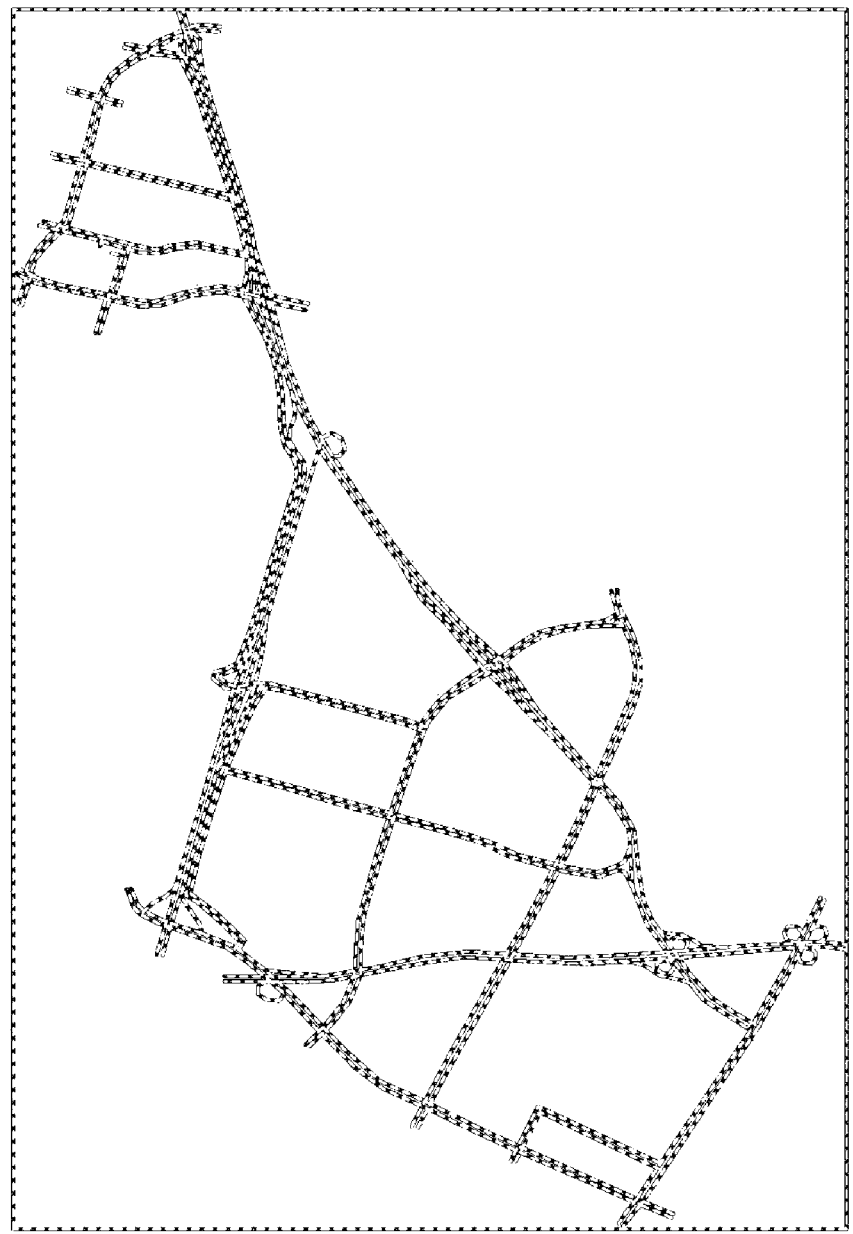
FIG. 10 is a diagram illustrating a state in which the map data offset uniformly is corrected on the basis of the correction amount of a distorted error.

FIG. 10 is a diagram illustrating a state in which the map data offset uniformly is corrected on the basis of the correction amount of a distorted error. As illustrated in the figure, the distortion correction function of the controller 110 serves to offset each point of the map data, which has been uniformly offset using the uniform offset function, in the x-axis direction, y-axis direction, and z-axis direction and rotate the map data around the z-axis each by an amount corresponding to the determined correction amount of the distorted error.

Figure 11:
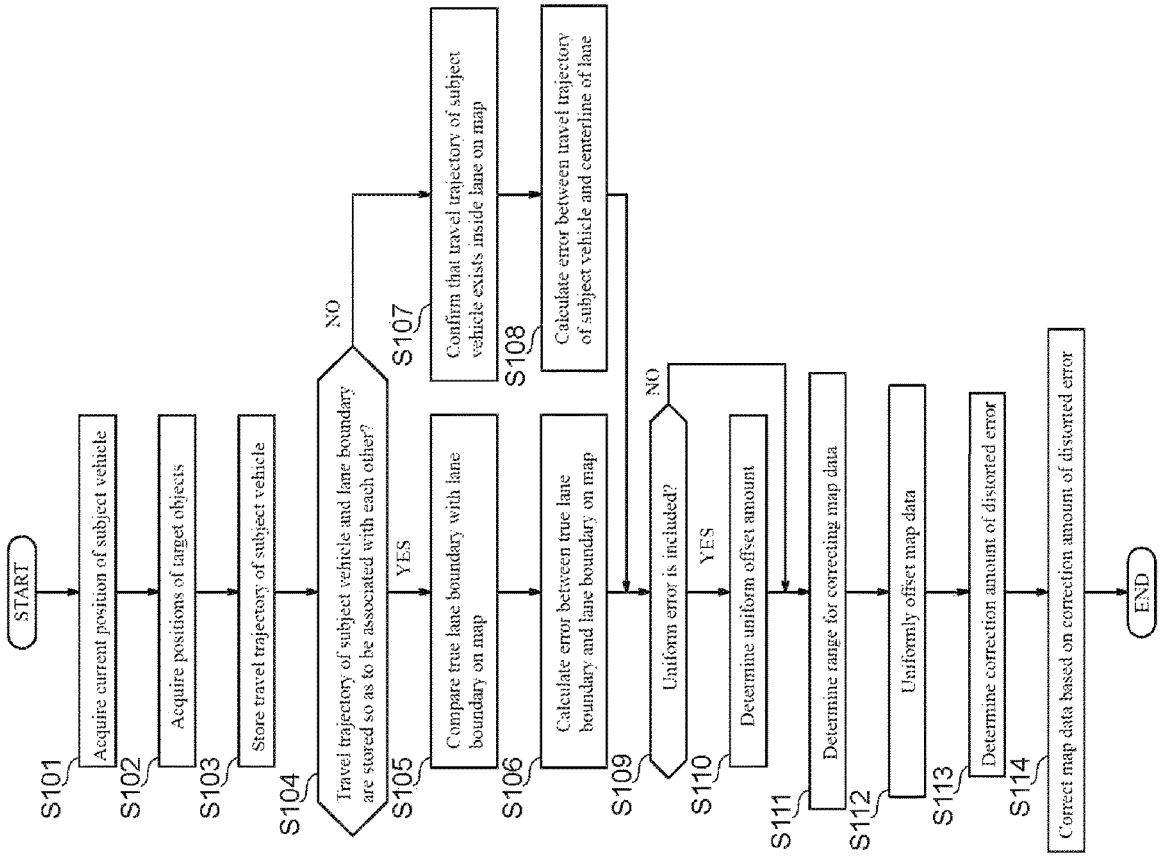
FIG. 11 is a flowchart for describing a map data correction process executed by the map data correcting device according to one or more embodiments of the present invention.

FIG. 11 is a flowchart for describing a map data correction process executed by the map data correcting device 100 according to one or more embodiments of the present invention. First, the subject vehicle is made to travel twice or more in the same area (e.g., a tile unit) during the offline mode. In this operation, the subject vehicle position acquisition function of the controller 110 serves to acquire information on the current position of the subject vehicle from the position detection device 101 (step S101), and the target object position detection function of the controller 110 serves to receive information on the positions of target objects including lane boundary lines from the sensor unit 103 (step S102).

Then, in step S103, the travel trajectory storage function of the controller 110 serves to arrange the positions of the subject vehicle in time series every predetermined time and store them in the storage device 104 as a travel trajectory of the subject vehicle. In this step, the travel trajectory storage function of the controller 110 serves to store, in the storage device 104, the travel trajectory of the subject vehicle and information on the relative positions of the target objects including lane boundary lines to the subject vehicle so that the travel trajectory and the information on the relative positions are associated with each other.

Then, in step S104, the correction element separation function of the controller 110 serves to determine whether or not the travel trajectory of the subject vehicle and a lane boundary line detected using the target object position detection function are stored in the storage device 104 so as to be associated with each other. An affirmative determination in this step is followed by step S105 while a negative determination in this step is followed by step S107.

In step S105, the correction element separation function of the controller 110 serves to compare the true lane boundary line stored in the storage device 104 with the lane boundary line on the map preliminarily stored in the map information unit 102. Then, in step S106, the correction element separation function of the controller 110 serves to calculate an error between the true lane boundary line and the lane boundary line on the map. Step S106 is followed by step S109.

On the other hand, in step S107, the correction element separation function of the controller 110 serves to confirm that the travel trajectory of the subject vehicle is included inside a lane on the map. Then, in step S108, the correction element separation function of the controller 110 serves to calculate an error between the travel trajectory of the subject vehicle and the centerline of the lane. Step S108 is followed by step S109.

In step S109, the uniform error determination function of the controller 110 serves to determine whether or not a uniform error equal to or lager than a reference value is included between the true lane and the lane on the map or between the travel trajectory of the subject vehicle and the centerline of the lane. An affirmative determination in this step is followed by step S110 while a negative determination in this step is followed by step S111.

In step S110, the uniform offset function of the controller 110 serves to determine a uniform offset amount for uniformly offsetting the map data as a whole. Then, in step S111, the uniform offset function of the controller 110 serves to set a range for correcting the map data in terms of tiles. Then, in step S112, the uniform offset function of the controller 110 serves to uniformly offset, in terms of the tiles, the map data in the x-axis direction, y-axis direction, and z-axis direction and rotate the map data around the z-axis each by an amount corresponding to the determined uniform offset amount.

Then, in step S113, the distorted error determination function of the controller 110 serves to calculate a distorted error of the map data by the above-described first method or second method, and the distortion correction function of the controller 110 serves to determine a correction amount of the distorted error for each of the positions in the x-axis direction, y-axis direction, and z-axis direction and the rotation angle around the z-axis. Then, in step S114, the distortion correction function of the controller 110 serves to offset each point of the map data, which has been uniformly offset using the uniform offset function, in the x-axis direction, y-axis direction, and z-axis direction and rotate the map data around the z-axis each by an amount corresponding to the determined correction amount of the distorted error.

As described above, in the map data correcting method and device according to one or more embodiments of the present invention, a correction process of uniformly offsetting the map data as a whole thereby to reduce a general position error of the map data (i.e., the uniform error) and a correction process of reducing the distorted error which is a position error still remaining in the map data even after uniformly offsetting the map data as a whole are separately executed. This can reduce the degree of deviation between the actual lane and the lane in the map data, and the position of the subject vehicle can therefore be accurately positioned with respect to the lane on the map data.

In the map data correcting method and device according to one or more embodiments of the present invention, the reference information which includes at least one of a travel trajectory of the vehicle, a lane boundary line, and a map image (such as an aerial photo or a satellite image) is compared with the map data thereby to calculate a uniform error and a distorted error of the map data. For example, as described above, the uniform error and distorted error of the map data are calculated through acquiring the travel trajectory of the vehicle and the lane boundary line during the offline mode, storing them in the storage device 104 so as to be associated with each other, and comparing the lane boundary line stored in the storage device 104 with the lane boundary line on the map data. This enables a determination of the degree of deviation between the actual lane and the lane in the map data. Moreover, by comparing the lane boundary line of the aerial photo with the lane boundary line on the map data, for example, the degree of deviation between the actual lane and the lane on the map data can be determined even for a point at which the receiver sensitivity of the GPS receiver is insufficient.

In the map data correcting method and device according to one or more embodiments of the present invention, the uniform error and distorted error of the map data are calculated on the basis of a difference between the true lane boundary and the lane boundary on the map data. Information on the true lane boundary is acquired by the onboard sensor unit 103, for example, when the vehicle is made to travel during the offline mode. This enables a determination of the degree of deviation between the actual lane and the lane on the map data.

In the map data correcting method and device according to one or more embodiments of the present invention, fitting of an approximate curve based on the least-square method is performed for the difference between the true lane boundary and the lane boundary on the map data, the uniform error of the map data is calculated on the basis of the minimum value of the difference of the obtained approximate curve, and the distorted error of the map data is calculated on the basis of a variance value of the obtained approximate curve. This allows the uniform error and distorted error of the map data to be easily calculated with a high degree of accuracy.

In the map data correcting method and device according to one or more embodiments of the present invention, the Fourier series expansion is performed for the difference between the true lane boundary and the lane boundary on the map data, the uniform error of the map data is calculated on the basis of the DC component obtained by the Fourier series expansion, and the distorted error of the map data is calculated on the basis of the AC component obtained by the Fourier series expansion. This allows the uniform error and distorted error of the map data to be easily calculated with a high degree of accuracy.

Here, the distortion of the map data tends to increase gradually from the above reference point toward the end point of the map data. In the map data correcting method and device according to one or more embodiments of the present invention, therefore, a point on the map data at which the difference between the true lane boundary and the lane boundary on the map data is minimum when the map data as a whole is uniformly offset is set as a reference point, and the distorted error of the map data is calculated so that the distorted error increases gradually from the reference point toward an end point of the map data. Additionally or alternatively, in the map data correcting method and device according to one or more embodiments of the present invention, the distorted error of the map data at each point of the map data is calculated by multiplying the relative distance from the above reference point to each point of the map data by a constant. Additionally or alternatively, in the map data correcting method and device according to one or more embodiments of the present invention, the distorted error at each point of the map data is calculated using a function that formulates a relationship between the relative distance from the above reference point to each point of the map data and the distorted error of the map data. This allows the distorted error of the map data to be appropriately calculated in accordance with the point on the map data.

In the map data correcting method and device according to one or more embodiments of the present invention, information on features including traffic signals and signs, etc. is acquired by the onboard sensor unit 103 when the vehicle is made to travel during the offline mode, for example, and the distorted error of the map data is calculated by comparing the information on the features with information on the features included in the map data. This allows the distorted error in the vicinity of an intersection in the map data to be calculated with a high degree of accuracy.

In the map data correcting method and device according to one or more embodiments of the present invention, for a point at which the receiver sensitivity of the GPS receiver is less than a predetermined reference value, the correction process of reducing the distorted error of the map data is not executed. Through this operation, the correction process of reducing the distorted error of the map data can be prevented from being performed on the basis of the positional information of the vehicle which is erroneously detected.

In the map data correcting method and device according to one or more embodiments of the present invention, for a point at which the slip angle of the vehicle is not less than a predetermined reference value, the correction process of reducing the distorted error of the map data is not executed. Through this operation, the correction process of reducing the distorted error of the map data can be prevented from being performed on the basis of the positional information of the vehicle which is erroneously detected due to the influence of the vehicle behavior.

In the map data correcting method and device according to one or more embodiments of the present invention, the correction process of reducing the distorted error of the map data includes executing a process of correcting the position of each point of the map data in the x-axis direction, y-axis direction, and z-axis direction and a process of rotating the map data around the z-axis. This allows the correction of the map data to be carried out more precisely.

Here, as described above, the map data contains errors in absolute coordinates and errors in relative coordinates. In general, errors in absolute coordinates tend to be larger than errors in relative coordinates. As such, in the process of uniformly offsetting the map data, it is preferred to uniformly offset a limited range in the map data rather than uniformly offsetting the map data as a whole. In the map data correcting method and device according to one or more embodiments of the present invention, therefore, the correction process of reducing the uniform error of the map data includes uniformly offsetting the map data as a whole in terms of tiles that constitute the map data. Additionally or alternatively, in the map data correcting method and device according to one or more embodiments of the present invention, the correction process of reducing the uniform error of the map data includes uniformly offsetting the map data as the whole in terms of areas for which a conversion operation is performed when the map data of an absolute coordinate system based on the latitude/longitude is converted into the map data of an orthogonal coordinate system for each of the areas. This can reduce the degree of deviation between the actual lane and the lane on the map data.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

100 Map data correcting device
104 Storage device
110 Controller

The invention claimed is:

1. A map data correcting method for correcting map data used in a vehicle using a controller, comprising:
   obtaining, by a device located on or in the vehicle, reference information on surroundings of the vehicle;
   executing, by the controller, a first correction process of uniformly offsetting the map data as a whole to reduce a first error, the first error being a general position error of the map data, the first error being a general position error of the map data relative to the reference information;
   executing, by the controller, a second correction process of reducing a second error in which a position error of the map data increases gradually from a reference point, the second error still remaining in the map data even after uniformly offsetting the map data as the whole; and
   using or transmitting, by the controller, the corrected map data,
   wherein the second correction process comprises:
      setting the reference point at a position with a minimum error among positions included in the map data after being offset;
      calculating a correction amount of the second error, the correction amount increasing gradually from the set reference point; and
      correcting each of the positions included in the map data with the calculated correction amount.

2. The map data correcting method according to claim 1, comprising:
   calculating the first error and the second error of the map data by comparing the reference information with the map data, the reference information including at least one of a travel trajectory of the vehicle, a lane boundary, and a map image.

3. The map data correcting method according to claim 2, wherein
   the reference information includes information on the lane boundary,
   the map data includes information on the lane boundary, and
   the first error and the second error of the map data are calculated on a basis of a difference between the lane boundary of the reference information and the lane boundary on the map data.

4. The map data correcting method according to claim 3, comprising:
performing fitting of an approximate curve based on a least-square method for the difference between the lane boundary of the reference information and the lane boundary on the map data;
calculating the first error of the map data on a basis of a minimum value of a difference of the obtained approximate curve; and
calculating the second error of the map data on a basis of a variance value of the obtained approximate curve.

5. The map data correcting method according to claim 3, comprising:
performing Fourier series expansion for the difference between the lane boundary of the reference information and the lane boundary on the map data;
calculating the first error of the map data on a basis of a DC component; and
calculating the second error of the map data on a basis of an AC component.

6. The map data correcting method according to claim 3, comprising:
setting, as the reference point, a point at which the difference between the lane boundary of the reference information and the lane boundary on the map data is minimum when the map data as the whole is uniformly offset; and
calculating the second error of the map data so that the second error increases gradually from the reference point toward an end point of the map data.

7. The map data correcting method according to claim 6, comprising:
calculating the second error at each point of the map data by multiplying a relative distance from the reference point to each point of the map data by a constant.

8. The map data correcting method according to claim 6, comprising:
calculating the second error at each point of the map data using a function that formulates a relationship between a relative distance from the reference point to each point of the map data and the second error.

9. The map data correcting method according to claim 1, wherein
the reference information includes information on features including at least one of a traffic signal and a traffic sign, and
the second error is calculated by comparing the information on the features included in the reference information with information on the features included in the map data.

10. The map data correcting method according to claim 2, wherein
a position of the vehicle is acquired using a GPS receiver and stored in a storage device, and
the second correction process is not executed for a point at which a receiver sensitivity of the GPS receiver is less than a predetermined reference value.

11. The map data correcting method according to claim 2, wherein
a slip angle of the vehicle is detected and stored in a storage device together with a corresponding point, and
the second correction process is not executed for a point at which the slip angle of the vehicle is not less than a predetermined reference value.

12. The map data correcting method according to claim 1, wherein
the second correction process includes a process of correcting a position of each point of the map data in an x-axis direction, a y-axis direction, and a z-axis direction and a process of rotating the map data around the z-axis.

13. The map data correcting method according to claim 1, wherein
the first correction process includes uniformly offsetting the map data as the whole in terms of tiles that constitute the map data.

14. The map data correcting method according to claim 1, wherein
the first correction process includes uniformly offsetting the map data as the whole in terms of areas for which a conversion operation is performed when the map data of an absolute coordinate system based on latitude/longitude is converted into the map data of an orthogonal coordinate system for each of the areas.

15. A map data correcting device comprising a controller configured to correct map data used in a vehicle, the controller being further configured to:
obtain by a device located on or in the vehicle, reference information on surroundings of for the vehicle;
execute a first correction process of uniformly offsetting the map data as a whole to reduce a first error, the first error being a general position error of the map data relative to the reference information;
execute a second correction process of reducing a second error in which a position error of the map data increases gradually from a reference point, the second error still remaining in the map data even after uniformly offsetting the map data as the whole; and
use or transmit the corrected map data,
wherein the second correction process comprises:
setting the reference point at a position with a minimum error among positions included in the map data after being offset;
calculating a correction amount of the second error, the correction amount increasing gradually from the set reference point; and
correcting each of the positions included in the map data with the calculated correction amount.

* * * * *